United States Patent [19]

Shapess

[11] Patent Number: 4,587,403

[45] Date of Patent: May 6, 1986

[54] THERMOSTAT SETBACK CONTROLLER SUB-BASE

[75] Inventor: Robert P. Shapess, Cato, N.Y.

[73] Assignee: Snyder General Corporation, Red Bud, Ill.

[21] Appl. No.: 488,102

[22] Filed: Apr. 25, 1983

[51] Int. Cl.⁴ .................. H01H 37/14; H04Q 7/00
[52] U.S. Cl. ................................. 219/366; 219/511;
236/46 R; 236/68 B; 337/377
[58] Field of Search ............ 219/366, 200, 201, 362,
219/374, 511, 520; 337/377; 236/46 R, 68 B

[56] References Cited

U.S. PATENT DOCUMENTS

| | | | |
|---|---|---|---|
| 3,277,260 | 10/1966 | Anderson | 337/377 |
| 3,284,002 | 11/1966 | Edelmon et al. | 236/68 B |
| 3,339,043 | 8/1967 | Baak | 236/68 B |
| 3,588,774 | 6/1971 | Caveney | 337/377 |
| 3,659,782 | 5/1972 | Chambers | 236/68 B |
| 3,668,594 | 6/1972 | Kulick | 337/377 |
| 3,834,618 | 9/1974 | Buckwalter | 219/511 |
| 3,972,471 | 8/1976 | Ziegler | 236/68 B |
| 4,014,500 | 3/1977 | Galtz | 219/511 |
| 4,217,646 | 12/1980 | Caltagirone et al. | 364/493 |
| 4,223,291 | 9/1980 | Teichert | 236/46 R |
| 4,315,137 | 2/1982 | Dahms | 219/366 |
| 4,321,458 | 3/1982 | Comber | 219/511 |

FOREIGN PATENT DOCUMENTS

| | | | |
|---|---|---|---|
| 1095145 | 2/1981 | Canada | 337/377 |
| 2757143 | 9/1978 | Fed. Rep. of Germany | 236/68 B |

*Primary Examiner*—C. L. Albritton
*Assistant Examiner*—Geoffrey S. Evans
*Attorney, Agent, or Firm*—Hubbard, Thurman, Turner & Tucker

[57] ABSTRACT

A sub-base for use in conjunction with thermostats for controlling air conditioned spaces includes a false heat device and a radio frequency receiver and control circuit for turning on and off the false heat device to provide temperature setback control for the thermostat. The sub-base may be mounted between the thermostat and the existing wall mounting structure and is adapted to be connected to the thermostat control conductors for a source of power for the sub-base and to receive radio frequency signals transmitted over the thermostat conductors.

7 Claims, 5 Drawing Figures

THERMOSTAT SETBACK CONTROLLER SUB-BASE

BACKGROUND OF THE INVENTION

1. Field of the Invention

The present invention pertains to a thermostat sub-base having a control circuit including a radio frequency signal receiver and a heat source for controlling a thermostat to setback the thermostat set temperature in response to transmission of radio frequency control signals to the receiver over the thermostat power line.

2. Background

The increased cost of energy has made it highly desirable to more efficiently control the heating and cooling of air conditioned spaces in homes, office buildings, hotels and various other installations. Remote control systems have been developed which are adapted to transmit radio frequency control signals from a central control station over power lines leading to various appliances such as heating and air conditioning units to remotely energize or deenergize the units using a receiver and a switch controller located at each appliance for selective control. Temperature responsive controllers or thermostats have also been developed with are time controlled to setback the controlled temperature in a conditioned spaced when the space is unoccupied or, for example, in a home or hotel when the occupants are sleeping. Temperature setback and other control modes have been provided for thermostats which are so called hard wired to a control station and by the use of radio frequency or so called wireless signal transmission as described above. An example of a remote control system for control of various appliances by transmission of radio frequenct signals over power line wiring is described in U.S. Pat. No. 4,217,646 to Caltagirone, et al. and assigned to the assignee of the present invention.

However, the installation of a complete remote control system is relatively complex and typically only feasible in new installations. Retrofitting of existing thermostat installations with hard wired remote control switching is also impractical in many installations. It is also, of course, quite expensive to replace existing thermostats with new ones equipped with radio frequency signal receivers. Accordingly, it has been considered particularly desirable to be able to retrofit existing heating and air conditioning installations by the addition of a device which will provide remote control of temperature setback without rewiring the existing control system and without requiring the installation of new thermostat controls. It is to this end that the present invention has been developed. The invention provides a unique thermostat mounting structure which is adapted to provide for temperature setback utilizing existing thermostat devices and also adapted to be remotely controlled by the transmission of radio frequency signals over the existing thermostat control circuit.

SUMMARY OF THE INVENTION

The present invention provides an apparatus adapted to be used in conjunction with conventional thermostats to provide for temperature setback control of the thermostat utilizing existing thermostat control circuitry and existing or conventional thermostat structure.

In accordance with one aspect of the present invention there is provided a thermostat sub-base which is adapted to be mounted at the existing thermostat mounting, such as a conventional electrical conduit junction box or the like, in proximity to the existing thermostat and to provide heat flow to the thermostat sufficient to provide a so called false heat signal for causing predetermined setback of the actual conditioned space temperature which will actuate the thermostat. The thermostat sub-base is provided with a control circuit including a receiver for receiving radio frequency signals transmitted over the electrical conductors leading to the thermostat for operating a false heat source to turn on or off in accordance with a selected command signal.

In accordance with another aspect of the present invention there is provided a thermostat sub-base which is adapted to be placed between the thermostat housing and a mounting point for the thermostat and which is provided with a circuit which may be connected to electrical control conductors or power conductors leading to the thermostat to provide energy for the false heat source and for control circuitry including a radio frequency receiver for operating the false heat source.

In a preferred embodiment of the present invention there is provided a sub-base comprising a relatively thin planar plate portion having a recess therein and adapted to be mounted between the thermostat housing and the existing thermostat support structure, such as an electrical conduit junction box or the like. The sub-base is adapted to receive at least a portion of the thermostat housing and to be supported between the thermostat housing and its existing mounting structure whereby no modification to the thermostat or the mounting structure is required. The sub-base is also provided with a housing portion disposed below the thermostat housing which includes a source of false heat such as an electrical resistance heating element disposed to provide a heated air flow through the thermostat housing to provide a false reading for the thermostat to effectively setback the temperature controlled by the thermostat.

In accordance with another aspect of the present invention there is provided a false heat device and a controller therefor incorporated in a thermostat sub-base which may be retrofitted to existing thermostat installations and connected to the electrical control or power conductors leading to the thermostat to provide power for the false heat device and to receive radio frequency control signals transmitted over the thermostat control or power conductors. Accordingly, conventional thermostat installations may be retrofitted with setback controls which may be remotely controlled from a central control station by the transmission of coded radio frequency signals over the thermostat control and/or power conductors.

The present invention provides several advantages in controlling heating and air conditioning apparatus utilizing conventional thermostat controls. Conventional thermostats may be retrofitted with a temperature setback device without the installation of additional wiring or modification of the existing thermostat device itself. The improved thermostat sub-base is adapted to accommodate the existing thermostat structure and mounting arrangement without modification of the thermostat housing or the structure on which the thermostat was previously mounted. The sub-base is aesthetically pleasing and does not disfigure or otherwise interfere with existing thermostat installations. The sub-base of the present invention may be connected directly to the thermostat wiring to receive power from the sub-base control circuitry and a false heat source and to receive radio frequency control signals transmitted over the thermostat control or power conductors. The sub-base is conveniently provided with controls for adjusting the input control signal code, the amount of temperature setback and manual override of the setback function. The controls are arranged on the sub-base to be accessible on the basis of need for access.

The abovementioned advantages as well as other superior features of the present invention will be apparent to those skilled in the art upon reading the detailed description which follows in conjunction with the drawings.

DESCRIPTION OF THE PREFERRED EMBODIMENT

Figure 3:
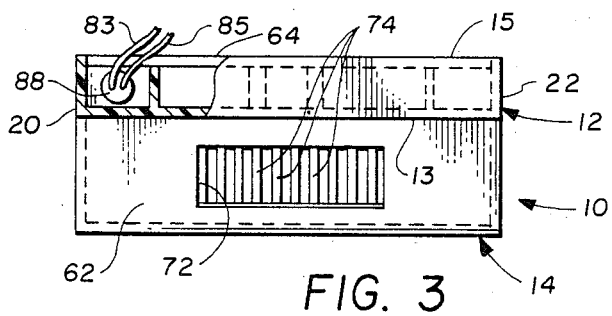
FIG. 3 is a top plan view of the sub-base.

In the description which follows like parts are marked throughout the specification and drawings with the same reference numerals, respectively. The drawings are not necessarily to scale and certain features of the invention may be shown exaggerated in scale or in schematic form in the interest of clairty and conciseness.

Referring now to FIGS. 1 through 4 there is illustrated a thermostat sub-base in accordance with the present invention, and generally designated by the numeral 10. The sub-base 10 is characterized by an elongated generally rectangular planar mounting plate portion 12 including a thermostat mounting surface 13. A housing portion 14 is formed integral with the mounting plate portion and projects from the thermostat mounting surface 13 at one end of the sub-base. The sub-base 10 also includes a wall mounting surface 15 opposite the surface 13 and formed by the peripheral edge of opposed end wall portions 16 and 18 and opposed sidewall portions 20 and 22. The mounting surface 13 is formed by a generally planar wall portion 24 which is integral with the end wall 16 and the sidewalls 20 and 22 to form a generally hollow structure which may be suitably ribbed to provide adequate strength to the walls 16, 18, 20, 22 and 24. The sub-base 10 is preferably formed from a suitable injection molded plastic, for example.

The sub-base plate portion 12 is provided with a generally rectangular recess 28 including opposed slots 30 and 32. The recess 28 is adapted to receive a housing portion 33 of a conventional wall mounted thermostat, generally designated by the numeral 34, FIGS. 1 and 2. The thermostat 34 includes the aforementioned housing portion 33, a mounting plate 38 and a standoff housing portion 40. The thermostat 34 also comprises a temperature selector knob 42 projecting from the face thereof. The thermostat 34 is exemplary and it will be understood that the sub-base 10 may be adapted to be used with several types of thermostats having particular housing configurations. However, one suitable type of thermostat for use with the sub-base 10 is a Mode M-21-SP manufactured by Eaton Corp., Mears Controls, Beaverton, Oreg. The thermostat 34 includes a temperature responsive switch disposed under cover of the standoff housing portion 40, which switch is designated by the numeral 44 in the schematic diagram of FIG. 5. The switch 44 is responsive to the temperature of air flowing through the thermostat to operate a heating or air conditioning unit or the like as will be described in further detail herein.

Figure 1:
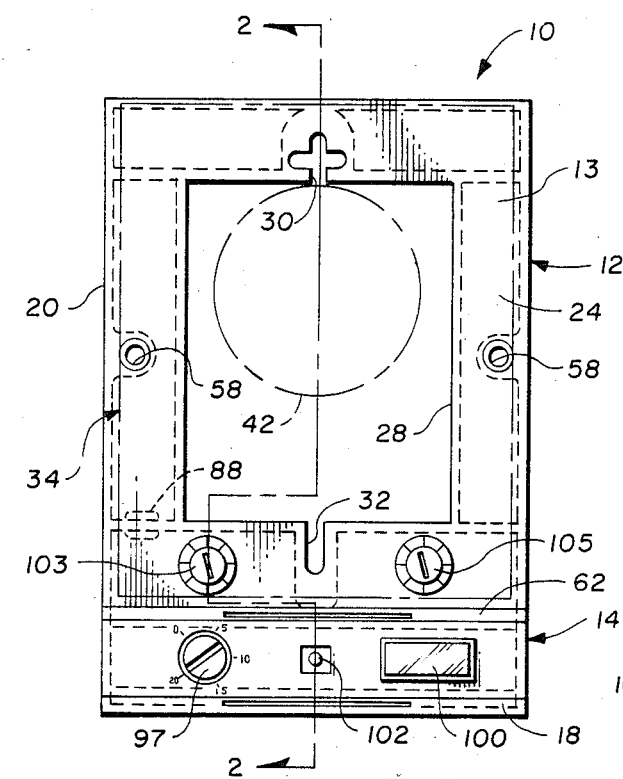
FIG. 1 is a front elevation view of the thermostat sub-base of the present invention.
Figure 2:
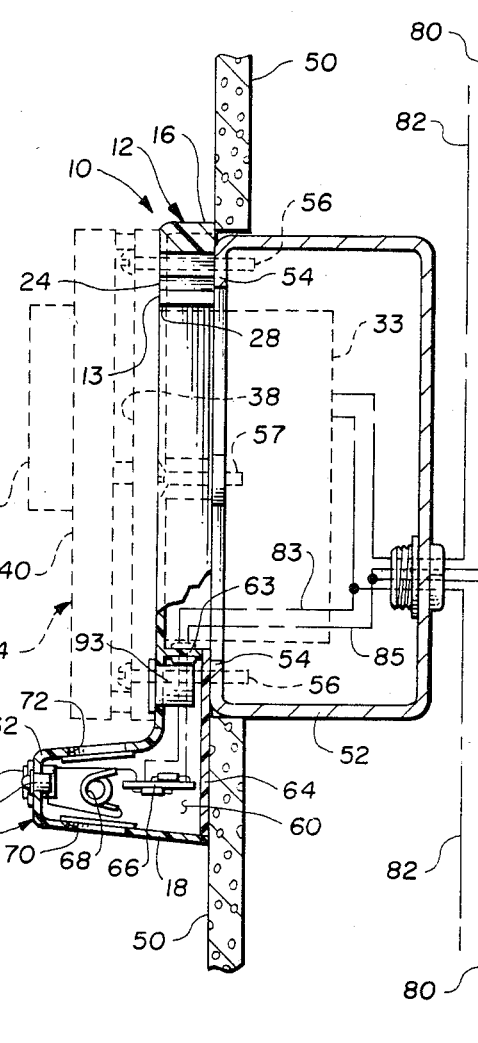
FIG. 2 is a section view taken along the line 2—2 of FIG. 1 and showing the sub-base installed at a thermostat mounting.

The sub-base 10 is adapted to receive the thermostat housing portion 33 and also to support the thermostat mounting plate 38 on the mounting surface 13 as illustrated in FIGS. 1 and 2. The sub-base 10 is also adapted to be mounted against a wall surface 50, FIG. 2, between the thermostat 34 and a conventional electrical conduit junction box or enclosure 52. The enclosure 52 is of a conventional type and is provided with opposed tangs 54 adapted to receive mounting screws or the like 56. In a preferred arrangement the thermostat 34 is mounted on the wall 50 with the sub-base 10 sandwiched between the housing portion 38 and the wall and secured to the enclosure 52 by the screws 56 which project through suitable mounting holes in the thermostat mounting plate 38 and through the notches 30 and 32 in the plate portion 12, respectively. As shown in FIGS. 1 and 2, the sub-base 10 may also be secured directly to the wall 50 or the enclosure 52 by suitable fasteners 57, one shown in FIG. 2, disposed in opposed holes 58 in the plate portion 12.

Figure 4:
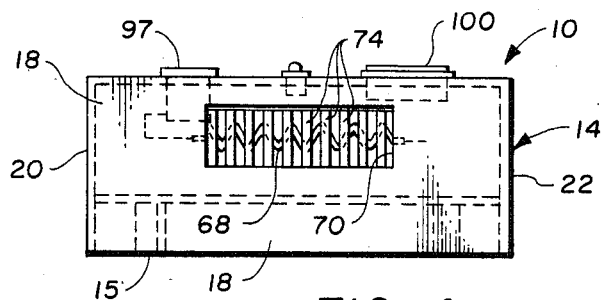
FIG. 4 is a bottom plan view of the sub-base.

The housing portion 14 of the sub-base 10 defines an enclosed area 60 which may be closed by a top wall 62-63 and a removable cover 64 suitable secured to the lower portion of the back side of the plate portion 12, as illustrated in FIG. 2. The enclosure 60 is adapted to receive means comprising an electrical circuit, which includes several components which may be suitable mounted on a circuit board or the like, generally designated by the numeral 66 in FIG. 2, and which will be described in general terms herein. The circuit board 66 is suitably connected to an electrical resistance type heating element 68 also disposed in the enclosure 60 between opposed openings 70 and 72. The openings 70 and 72 are formed in the bottom wall 18 and in the top wall portion 62, respectively, as shown in FIGS. 2, 3 and 4. The openings 70 and 72 may be provided with suitable louvers or flow directing vanes 74 which also form a protective grillwork or the like for the openings. The heating element 68 is adapted to produce heat in response to the application of electrical current thereto to heat air within the enclosure 60 and cause air to flow into the enclosure through the opening 70 and out of the enclosure through the opening 72. The heated air flowing out of the opening 72 flows directly through the thermostat 34 to cause the sensor of the thermally responsive switch 44 to give the thermostat an essentially false reading of the temperature in the room or other conditioned space in which the thermostat is located. Accordingly, depending on the amount of heat generated by the element 68, the decrease in temperature of the conditioned space from that set for operation of the thermostat may be varied.

The system described herein may be utilized in conjunction with heating as well as cooling appliances by reversing the operating cycle of the heating element for the respective operating modes. The voltage applied to the heating element 68 may be varied to vary the heat output to vary the false reading taken by the thermostat. Accordingly, a conventional thermostat such as the thermostat 34 may be provided with a so called temperature setback control by placing the sub-base 10 in the position shown in FIG. 2 between the thermostat housing and its original mounted position on the enclosure 52 without modifying the thermostat itself or the control wiring leading to the thermostat.

Figure 5:
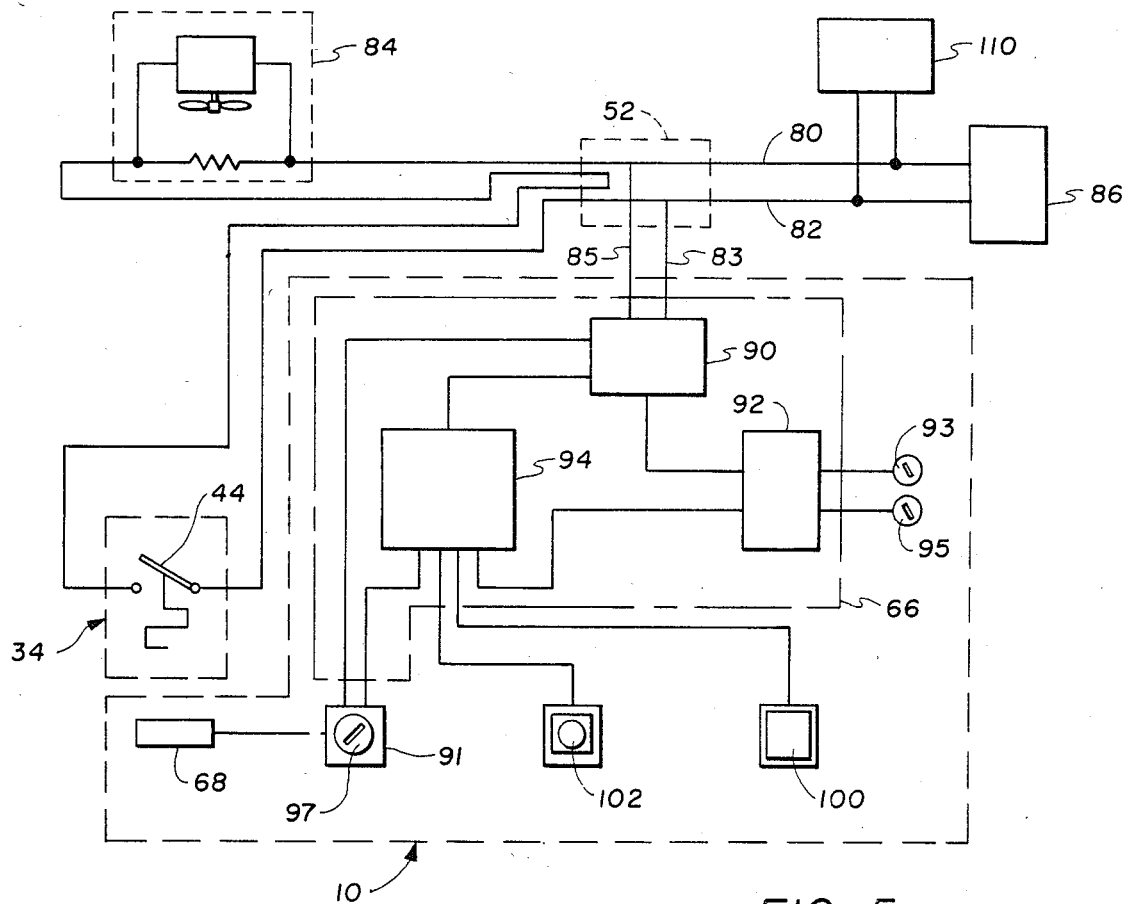
FIG. 5 is a schematic diagram of the sub-base control circuit in conjunction with the thermostat control circuit for a heating unit.

As shown in FIG. 2, the enclosure 52 receives electrical power conductors 80 and 82 which are suitable connected to a source of electrical power 86, FIG. 5. The conductors 80 and 82 also exit the enclosure 52 and are connected to an appliance such as an air conditioning system including a heating unit, generally designated by the numeral 84 in FIG. 5. In the arrangement illustrated by way of example, the thermostat 34 is of a type which operates to directly interrupt the power circuit to the heater unit 84 by way of the conductors 80 and 82 connected to the electrical source 86. It will be understood that the thermostat sub-base of the present invention may also be adapted to be used in conjunction with thermostat control circuits which use a low voltage circuit to operate a power line relay or the like.

The sub-base 10 is adapted to be connected to the source 86 using the conductors 80 and 82 by way of electrical conductor leads 83 and 85. The leads 83 and 85 are suitably interconnected to the conductors 80 and 82 and extend into the enclosure 60 through the wall portion 63 by way of a suitable strain relief grommet 88, FIG. 3. The conductors 80 and 82 serve as a source of power from the heating element 68 and the control circuitry to be described herein as well as a control signal carrier for operating the sub-base 10 to turn on or off the heating element 68. Accordingly, as will be appreciated from reading the further description herein the sub-base 10 may be adapted to control the operation of the heating element 68 without the addition of special control circuit wiring for the sub-base.

Referring further to FIG. 5, there is illustrated a schematic diagram of the major components of the control circuitry for the sub-base 10. The control circuit for the sub-base 10 typically includes a power line voltage stepdown and converting type power supply 90 having suitable taps for various outputs to a heating element controller 91, a radio frequency signal receiver 92 and a detector and logic circuit 94. The receiver 92 and logic circuit 94 are preferably of a type similar to that described in U.S. Pat. No. 4,217,646 which is incorporated herein by reference. The receiver 92 may be modified to be responsive to a preselected input signal, as determined by selector switches 93 and 95, which will provide a suitable output signal to the logic circuit 94. The switches 93 and 95 may be adapted to select particular ones of crystals connected in parallel with each other in a receiver circuit similar to that described in U.S. Pat. No. 4,217,646. Alternatively, the receiver circuit may be provided with other suitable frequency selection circuit means which may be operated by the selector switches 93 and 95 whereby the frequency of the signal which will effect operation of the detector and logic circuit 94 may be preselected. The switches 93 and 95 are operable to select a signal frequency which is operable to produce an output signal from the receiver 92 of controlled duration, for example, so that a plurality of sub-bases 10 may be connected to the same power line circuit and operate at selected input signals.

The control circuit 91 typically includes a switch adapted to be controlled by the circuit 94 to turn the heating element 68 on or off. The circuit 91 is also adapted to select the voltage applied to the heating element 68 to vary the heat output thereof. Referring briefly to FIG. 1, the circuit 91 includes selector switch means 97 whereby the setback temperature of the sub-base 10 may be preselected. The switch 97 preferably includes a selector actuator of the recessed screwdriver slot type, as illustrated.

The control circuit 94 is also adapted to be provided with a manual override switch 100 and a suitable visual indicator 102. The switch 100 is operable to override the operation of the circuit 94 to deenergize the heating element 68 until the manual override signal is cancelled or another signal is input to the circuit 94 by way of the receiver 92.

Referring to FIGS. 1 and 2, it will be noted that the switches 93 and 95 are mounted within the enclosure 60 and are also of the type which are provided with screwdriver slot type actuators 103 and 105, preferably mounted flush with the mounting surface 13. Accordingly, with the thermostat 34 installed on the sub-base 10 of the switches 93 and 95 are covered by the thermostat housing portion 38 when the housing portion is mounted in the position indicated in dotted outline to prevent unwanted actuation of the switches unless the housing portion 38 is thereafter removed. Each of the switches 93 and 95 may be provided with suitable indicia suitably applied to the mounting surface 13. As shown in FIGS. 1 and 2 also, the switch 100 and the setback indicator lamp 102 are both conveniently mounted on the sub-base housing portion 14 for easy access and viewing.

Referring again to FIG. 5, control signals for operating the sub-base heating element 68 may be applied to the power conductors 80–82 by way of a control station 110 similar to that described in the aforementioned U.S. Pat. No. 4,217,646. The frequency of the control signal and the duration of the signal may be varied to effect a turning on or turning off of the heating element 68. The control station 110 may in itself include means for generating time controlled signals to operate the sub-base heating element in a preselected mode. The switches 93 and 95 may be adjusted to select the frequency for actuating a particular sub-base so that the control station 110 may be used to generate several signals over the power lines 80 and 82 which can, of course, be connected to other thermostat and appliance circuits.

It will be appreciated from the foregoing description that the sub-base 10 is easily retrofitted to existing control systems for heating or air conditioning one or more rooms within a building. With a source of radio frequency control signals such as the control station 110 suitable connected to the power conductors 80–82 it is merely necessary to preset the switches 93 and 95 for the signal receiver 92 for receiving a signal from the control station 110 related to a particular thermostat location, remove the thermostat, such as the thermostat 34, from its previous mounting on the enclosure 52, place the sub-base 10 between the thermostat and the enclosure, suitably connect the sub-base conductors or leads 83 and 85 to the conductors 80 and 82 and replace the thermostat housing over the sub-base.

The thermostat 34 is now provided with a so called false heat setback feature which may be remotely controlled to setback the sensed temperature of the conditioned space which will turn on the heating unit 84. For example, the station 110 can be adapted to provide a time controlled or digital coded signal transmitted to the receiver 92 through the conductors 80–82 at a preselected hour to turn on the heating element 68. This, in effect, would result in the actual temperature in the conditioned space controlled by the thermostat 34 to be reduced to a temperature lower than that set at the thermostat control knob 42 before the heating unit 84 would be energized. The amount of setback temperature may, of course, be controlled by the controller 91 by the setting of the switch 97. The controller 110 is operable to provide a second time controlled radio frequency signal to the receiver 92 of a predetermined frequency and/or pulse duration or of a second digital code which will effect operation of circuit 94 and of the controller 91 to turn off the heating element 68 at another preselected time so that the setback conditiion of the thermostat 34 will be cancelled. Those skilled in the art will appreciate that the receiver 92 may be adapted to be activated to operate the circuit 94 in response to variable frequency signals, pulse width signal modulation and binary coded signal modulation or other signal characteristics in accordance with receiver circuit capabilities.

Those skilled in the art will appreciate that with the provision of one or more of the sub-bases 10 large buildings have several thermostats controlling various conditioned spaces may be retrofitted with a minimum of expense to provide the temperature setback feature for night time or off hour control of room temperature and energy consumption. Accordingly, the present invention provides for improved energy efficiency of air conditioned spaces without the expense of replacing thermostats or adding other expensive controls.

Those skilled in the art will recognize that various substitutions and modifications may be made to the specific embodiment of the present invention without departing from the scope and spirit thereof are recited in the appended claims.

What I claim is:

1. A sub-base for use with a thermostat for an air conditioning system, said thermostat including a thermostat housing adapted to be mounted on structure such as an electrical conductor junction box, and a temperature responsive switch disposed in said thermostat housing, said thermostat housing being adapted to permit circulation of air therethrough and over sensing means for said temperature responsive switch, said sub-base comprising:
   a member including a plate portion constructed so as to mounted between a thermostat housing and a structure and to provide for mounting said thermostat housing on said structure without modification of said thermostat housing or said structure, a sub-base housing portion projecting from said plate portion in proximity to said thermostat housing and directly below said thermostat housing, electrical heating element means in said sub-base housing portion, and means forming openings in said sub-base housing portion for conducting air through said sub-base housing portion and oversaid heating element means and then to said thermostat housing to give a false heat signal to a temperature responsive switch of the thermostat to setback the temperature at which an air conditioning system is operated by said thermostat.

2. The sub-base set forth in claim 1 wherein:
said openings includes louver means for conducting heated air flow from said sub-base housing portion directly to said thermostat housing.

3. The sub-base set forth in claim 1 wherein:
said plate portion includes a recess therein for receiving a portion of said thermostat housing whereby a mounting portion of said thermostat housing may be mounted on said plate portion.

4. The sub-base set forth in clam 1 including:
a control circuit including conductor means for connecting said control circuit to electrical conductor means leading to said thermostat, said control circuit including receiver means for receiving a control signal transmitted over said conductor means to energize said heating element, said receiver means including means for selecting the control signal characteristic which is operable to energize said heating element.

5. The sub-base set forth in claim 1 including:
a controller for said heating element means including a selector switch mounted on said sub-base housing portion for selecting the heat output of said heating element.

6. A sub-base for use with a thermostat for an air conditioning system, said thermostat including a thermostat housing adapted to be mounted on structure such as an electrical conductor junction box, and a temperature responsive switch disposed in said thermostat housing, said thermostat housing being adapted to permit circulation of air therethrough and over sensing means for said temperature responsive switch, said sub-base comprising:
   a member including a portion forming a thermostat mounting surface adapted to be disposed between a thermostat housing and a structure, a sub-base housing portion projecting from said mounting surface in proximity to said thermostat housing, electrical heating element means in said sub-base housing portion, spaced apart openings in said sub-base housing portion for conducting air through said sub-base housing portion and over said heating element means and then to said thermostat housing to give a false heat signal to a temperature responsive switch of the thermostat to setback the temperature at which an air conditioning system is operated by said thermostat; and
   a control circuit on said sub-base including conductor means for connecting said control circuit to electrical conductor means leading to said thermostat, said control circuit including receiver means for receiving a control signal transmitted over said conductor means leading to said thermostat to energize and deenergize said heating element.

7. A sub-base for use with a thermostat for an air conditioning system, said thermostat including a thermostat housing adapted to be mounted on structure such as an electrical conductor junction box, and a temperature responsive switch disposed in said thermostat housing, said thermostat housing being adapted to permit circulation of air therethrough and over sensing means for said temperature responsive switch, said sub-base comprising:
   a member including a plate portion adapted to mount between a thermostat housing and a structure, a sub-base housing portion projecting from said plate portion directly below said thermostat housing, and electrical heating element means disposed in said sub-base housing portion;
   means in said sub-base housing portion for conducting air through said sub-base housing portion and over said heating element means and then to said thermostat housing to give a false heat signal to a temperature responsive switch of the thermostat to setback the temperature at which an air conditioning system is operated by said thermostat;

a control circuit including conductor means for connecting said control circuit to electrical conductor means leading to said thermostat, said control circuit including receiver means for receiving a control signal transmitted over said conductor means to energize said heating element, said receiver means including switch means for selecting the control signal characteristic which is operable to energize said heating element; and said switch means being mounted on said plate portion and adapted to be covered by said thermostat housing when said thermostat is mounted on said plate portion in such a way as to prevent actuation of said switch means without removal of said thermostat housing from said plate portion.

* * * * *